United States Patent Office 3,819,766
Patented June 25, 1974

3,819,766
PROCESS FOR PREPARING THERMOPLASTIC ELASTOMER
Yasuo Hata and Yasusuke Shuto, Chibaken, Japan, assignors to Idemitsu Kosan Co., Ltd., Tokyo, Japan
No Drawing. Filed Sept. 10, 1971, Ser. No. 179,590
Int. Cl. C08d 15/18, 15/22, 15/04, 19/08
U.S. Cl. 260—879
1 Claim

ABSTRACT OF THE DISCLOSURE

A thermoplastic elastomer is prepared by heating block copolymers comprising styrene, acrylonitrile or their derivatives as a thermoplastic component, and butadiene, isoprene, phenyl butadiene or their derivatives as an elastomer component in the presence of a cross-linking agent such as benzoyl peroxide, if necessary, at a temperature of 70° to 130° C. for 2 to 24 hours. The thermoplastic elastomer has a rubber elasticity and can be readily injection molded, and is very useful as engineering materials for shock absorbers and mechanical parts.

---

This invention relates to a process for preparing a thermoplastic elastomer, and more particularly to a process for preparing a thermoplastic elastomer by heating block copolymers of styrene or acrylonitrile with butadiene or isoprene in the presence of a cross-linking agent if required.

The present inventors have made vairous studies on a process for preparing a thermoplastic elastomer, and as a result have found that a novel thermoplastic elastomer having excellent properties can be prepared by heating block copolymers comprising styrene or acrylonitrile as a thermoplastic component and butadiene or isoprene as an elastomer component in the presence of a cross-linking agent if necessary.

A polymerization catalyst used in the present invention is the so-called living polymerization catalysts, for example, alkali metals such as lithium, sodium and potassium, or alkyl compounds thereof.

A suitable solvent used in the polymerization is tertiary amines or mixtures thereof with tetrahydrofuran, ether, benzene, toluene, hexane, heptane, cyclohexane or the like. As the tertiary amines, aliphatic tertiary amines such as trimethylamine, triethylamine, tripropylamine, etc. or heterocyclic amines such as pyridine, alkylpyridine, etc. are effective in the present invention.

In carrying out the polymerization, a catalyst and a solvent are charged into a reactor at first, and then monomers are charged into the reactor. In that case, it is advantageous for several reasons to charge the monomers of the elastomer component initially. The polymers formed by polymerization of the initially charged monomers are the so-called living polymers, whose activity is never lost unless there is an active compound, for example, water, alcohol, carbon dioxide, or the like. Successively, other monomers are charged into the reactor to prepare block copolymers.

Polymerization temperature is −50° to 150° C., and preferably 10° to 50° C. from the view point of polymerization operation.

The thus obtained block copolymers are separated from the solvent, and then subjected to heat treatment, whereby elastomer components of the block copolymers are bonded to one another. The degree of bonding can be adjusted by controlling a heating temperature and heating time.

At that bonding, a net-like cross-linking can be carried out on the basis of radical reaction by heating the block polymers in the presence of a cross-linking agent such as benzoyl peroxide, tert.-butyl hydroperoxide, acetyl peroxide, di-tert.-butyl peroxide, azobisisobutyronitrile, etc. In that case, the degree of bonding can be adjusted by controlling kind and concentration of the cross-linking agent, heating temperature and heating time.

Other examples of the thermoplastic components used in the present invention than those as menitoned above include α-methylstyrene, methacrylonitrile, acrylic acid ester, methacrylic acid ester, etc. and other examples of the elastomer components used in the present invention than those as mentioned above include butadiene derivatives such as phenylbutadiene, etc.

The novel thermoplastic elastomer prepared according to the present invention has a rubber elasticity and can be readily injection-molded, and thus is very useful as engineering materials such as a shock absorber, machine parts, etc.

Now, the present invention will be explained in detail, referring to Examples.

EXAMPLE 1

0.03 g. of metallic sodium in the form of a dispersion as a catalyst and 20 ml. of trimethylamine as a solvent were sampled into a 100-ml. capacity, pressure-resistant glass reactor provided with a stirrer, and 10 g. of styrene was added thereto and polymerized for one hour, while stirring the content of the reactor at 20° C. Then, 20 g. of butadiene was added thereto and subjected to polymerization for three hours. The resulting block copolymers were precipitated in methyl alcohol and taken out. A portion of the block copolymers was dissolved in an equal weight of benzene, and benzoyl peroxide was added thereto. The solution was heated at 80° C. for 2 hours. Another portion of the block copolymers was dissolved in an equal weight of benzene, and the solution was heated at 130° C. for 24 hours, without adding benzoyl peroxide thereto. The thus heat treated block copolymers were separated from benzene, and physical properties thereof were measured. The results are shown in Table 1, where the non-heat treated block copolymer is given for comparison.

EXAMPLE 2

0.05 g. of metallic sodium in the form of a dispersion as a catalyst and 50 ml. of a mixture solution of equal volumes of tetrahydrofuran and benzene as a solvent were sampled into a 300-ml. capacity, pressure-resistant glass reactor provided with a stirrer, and 70 g. of butadiene was added thereto and polymerized for 5 hours, while stirring the content of the reactor at 20° C. Then, 25 g. of styrene was added thereto and subjected to polymerization for two hours. The resulting block copolymers were precipitated in methyl alcohol and taken out. A portion of the block copolymers was added to an equal weight of benzene and divided into three equal aliquots. Different amounts of benzoyl peroxide were added to the first and the second aliquots which were then heated at 80° C. for 12 hours. As for the third aliquot, azobisisobutyronitrile was added thereto, and the resulting solution was heated at 80° C. for 8 hours. The thus heat treated block copolymers were separated from benzene, and physical properties thereof were measured. The results are shown in Table 2, where the non-heat treated block copolymer is given for comparison.

TABLE 1

| Amount of benzoyl peroxide added (parts by weight per part by weight of copolymer) | Heat treatment | Reduced viscosity [$\eta_{sp}$/c.] | Young's modulus [dyne/cm.$^2$] | Modulus (kg./cm.$^2$) | | |
|---|---|---|---|---|---|---|
| | | | | 100% elongation | 200% elongation | 300% elongation |
| 0 | None | 0.49 | 3.92×10$^6$ | 2.2 | 2.2 | 2.3 |
| 0 | 130° C., 24 hours | 0.52 | 4.21×10$^6$ | 2.6 | 3.2 | 3.2 |
| 1/100 | 80° C., 2 hours | 0.84 | 9.80×10$^6$ | 4.2 | 4.2 | 4.2 |
| 2/100 | do | 0.89 | 15.0×10$^6$ | 7.6 | 8.5 | 8.5 |

TABLE 2

| Amount of benzoyl peroxide (BPO) or azobisisobutyronitrile (AIBN) added (parts by weight per part by weight of copolymer | Heat treatment | Reduced viscosity [$\eta_{sp}$/c.] | Young's modulus [dyne/cm.$^2$] | Modulus (kg./cm.$^2$) | | |
|---|---|---|---|---|---|---|
| | | | | 100% elongation | 200% elongation | 300% elongation |
| 0 | None | 0.88 | 3.33×10$^6$ | 3.4 | 3.4 | 3.4 |
| 1/100 (BPO) | 80° C., 12 hours | (*) | 2.81×10$^7$ | 28.7 | 38.3 | 40.3 |
| 2/100 (BPO) | do | (*) | 4.26×10$^7$ | 43.5 | 56.7 | 66.1 |
| 1/100 (AIBN) | 70° C., 8 hour | (*) | 1.40×10$^7$ | 14.3 | 28.8 | 30.1 |

*Gel was partially formed and exact measurement could not be effected.

EXAMPLE 3

0.03 g. of metallic sodium in the form of a dispersion as a catalyst and 30 ml. of trimethylamine as a solvent were sampled into a 100-ml. capacity, pressure-resistant glass reactor provided with a stirrer, and 34 g. of butadiene was added thereto and polymerized for 3 hours, while stirring the content of the reactor at 20° C. Then, 6 g. of acrylonitrile was added thereto and subjected to polymerization for 2 hours. The resulting block copolymers were precipitated in methyl alcohol and taken out. Then, a portion of the block copolymers was dissolved in an equal weight of benzene, and benzoyl peroxide was added thereto. The solution was heated at 80° C. for 2 hours. The thus heat treated block copolymers were separated from benzene and physical properties thereof were measured. The results are shown in Table 3, where the non-heat treated block copolymer is given for comparison.

EXAMPLE 4

0.05 g. of metallic sodium in the form of a dispersion as a catalyst and 50 ml. of a mixture solution of equal volumes of tetrahydrofuran and benzene as a solvent were sampled into a 300-ml. capacity, pressure-resistant glass reactor provided with a stirrer, and 70 g. of butadiene was added thereto and polymerized for 5 hours, while stirring the content of the reactor at 20° C. Then, 15 g. of acrylonitrile was added thereto and subjected to polymerization for two hours. The resulting block copolymers were precipitated in methyl alcohol, and taken out. Then, a portion of the block polymers was added into an equal weight of benzene and benzoyl peroxide was added thereto. The solution was heated at 80° C. for 3 hours. The thus heat treated block copolymers were separated from benzene, and physical properties were measured. The results are shown in Table 4, where the non-heat treated block copolymer is given for comparison.

TABLE 3

| Amount of benzoyl peroxide added (parts by weight per part by weight of copolymer) | Heat treatment | Reduced viscosity [$\eta_{sp}$/c.] | Young's modulus [dyne/cm.$^2$] | Modulus (kg./cm.$^2$) | | |
|---|---|---|---|---|---|---|
| | | | | 100% elongation | 200% elongation | 300% elongation |
| 0 | None | 0.21 | 3.80×10$^6$ | 2.0 | 2.2 | 2.2 |
| 1/100 | 80° C., 2 hours | 0.30 | 7.00×10$^6$ | 3.3 | 3.4 | 3.5 |

TABLE 4

| Amount of benzoyl peroxide added (parts by weight per part by weight of copolymer) | Heat treatment | Reduced viscosity [$\eta_{sp}$/c.] | Young's modulus [dyne/cm.$^2$] | Modulus (kg./cm.$^2$) | | |
|---|---|---|---|---|---|---|
| | | | | 100% elongation | 200% elongation | 300% elongation |
| 0 | None | 0.35 | 3.09×10$^6$ | 3.15 | 3.40 | 3.55 |
| 1/100 | 80° C., 3 hours | (*) | 1.11×10$^7$ | 11.30 | 16.30 | 17.00 |

*Sparingly soluble in benzene, etc. Exact measurement could not be effected.

EXAMPLE 5

0.05 g. of metallic sodium in the form of a dispersion as a catalyst and 50 ml. of a mixture solution of equal volumes of tetrahydrofuran and benzene as a solvent were sampled into a 300-ml. capacity, pressure-resistant glass reactor provided with a stirrer, and 70 g. of butadiene was added thereto and polymerized for 5 hours, while stirring the content of the reactor at 20° C. Then, 15 g. of methyl methacrylate was added thereto and subjected to polymerization for 2 hours. The resulting block copolymers were precipitated in methyl alcohol and taken out. Then, a portion of the block copolymer was added to an equal weight of benzene and benzoyl peroxide was added thereto. The solution was heated at 80° C. for 3 hours. The thus heat treated block copolymers were separated from benzene, and physical properties were measured. The results are shown in Table 5, when the non-heat treated block copolymer is given for comparison.

TABLE 5

| Amount of benzoyl peroxide added (parts by weight per part by weight of copolymer) | Heat treatment | Reduced viscosity [$\eta_{sp}$/c.] | Young's modulus [dyne/cm.$^2$] | Modulus (kg./cm.$^2$) | | |
|---|---|---|---|---|---|---|
| | | | | 100% elongation | 200% elongation | 300% elongation |
| 0 | None | 0.4 | 3.17×10$^6$ | 3.23 | 3.31 | 3.35 |
| 1/100 | 80° C., 3 hours | (*) | 1.07×10$^7$ | 10.90 | 13.10 | 14.60 |

*Sparingly soluble in benzene, etc. Exact measurement could not be effected.

What is claimed is:

1. A process for producing a thermoplastic elastomer which comprises:
   (a) polymerizing butadiene in the presence of metallic sodium in the form of a dispersion as a catalyst and a mixture solution of equal volumes of tetrahydrofuran and benzene as a solvent for several hours,
   (b) thereafter adding acrylonitrile and subjecting it to polymerization for several hours to thereby produce block copolymers, and (c) heating the block copolymers produced by the foregoing steps at a temperature of 70° to 100° C. for 2 to 5 hours and in the presence of 1-2 wt. percent of benzoyl peroxide as a cross-linking agent.

References Cited

UNITED STATES PATENTS

| | | | |
|---|---|---|---|
| 3,251,905 | 5/1966 | Zelinski | 260—879 |
| 3,265,765 | 8/1966 | Holden et al. | 260—880 RX |
| 3,439,064 | 4/1969 | Makowski et al. | 260—879 |

JOSEPH L. SCHOFER, Primary Examiner

W. F. HAMROCK, Assistant Examiner

U.S. Cl. X.R.

260—880 B